(12) United States Patent
Hough et al.

(10) Patent No.: US 9,428,684 B2
(45) Date of Patent: Aug. 30, 2016

(54) ADDITION OF ZWITTERIONIC SURFACTANT TO WATER SOLUBLE POLYMER TO INCREASE THE STABILITY OF THE POLYMERS IN AQUEOUS SOLUTIONS CONTAINING SALT AND/OR SURFACTANTS

(75) Inventors: Lawrence Alan Hough, Philadelphia, PA (US); Gilda Maria Lizarraga, Cranbury, NJ (US); Herve Adam, Princeton, NJ (US); Jean-Christophe Castaing, Burlington, NJ (US); Subramanian Kesavan, East Windsor, NJ (US)

(73) Assignee: RHODIA OPERATION, Paris (FR)

( * ) Notice: Subject to any disclaimer, the term of this patent is extended or adjusted under 35 U.S.C. 154(b) by 1446 days.

(21) Appl. No.: 12/253,920

(22) Filed: Oct. 17, 2008

(65) Prior Publication Data
US 2009/0111716 A1    Apr. 30, 2009

Related U.S. Application Data

(60) Provisional application No. 60/984,183, filed on Oct. 31, 2007.

(51) Int. Cl.
*C09K 8/68* (2006.01)
*C09K 8/584* (2006.01)
*C09K 8/588* (2006.01)
*C09K 8/74* (2006.01)
*C09K 8/60* (2006.01)

(52) U.S. Cl.
CPC .............. *C09K 8/68* (2013.01); *C09K 8/584* (2013.01); *C09K 8/588* (2013.01); *C09K 8/602* (2013.01); *C09K 8/74* (2013.01); *C09K 2208/30* (2013.01)

(58) Field of Classification Search
CPC ........ C09K 8/68; C09K 8/588; C09K 8/584; C09K 2208/30; C09K 8/74; C09K 8/602
USPC .................. 516/202, 125, 127, 129; 507/129
See application file for complete search history.

(56) References Cited

U.S. PATENT DOCUMENTS 4,214,915 A * 7/1980 Dillarstone et al. ............ 134/19
4,222,881 A    9/1980 Byham et al.
(Continued)

FOREIGN PATENT DOCUMENTS

CA    1298697       4/1992
CA    2510241 A1    7/2004
(Continued)

OTHER PUBLICATIONS

Kirk Othmer Encyclopedia of Chemical Technology, "Carboxylic Acids, Manufacture", R. W. Johnson and R. W. Daniels, Union Camp Corporation, © 1993 by John Wiley & Sons, Inc. (Article Online Date: Dec. 4, 2000), pp. 1-2 obtained Online @ http://m rw.interscience.wiley.com/emrw/9780471238966/search/firstpage (downloaded Jun. 19, 2010).*

(Continued)

*Primary Examiner* — Daniel S Metzmaier

(57) ABSTRACT

An aqueous fluid composition useful for the recovery of hydrocarbons from a subterranean formation, including a mixture of water, a water soluble polymer, an inorganic salt and at least one zwitterionic surfactant and methods of using same.

27 Claims, 6 Drawing Sheets

(56) References Cited

U.S. PATENT DOCUMENTS

| | | | |
|---|---|---|---|
| 4,241,951 A | 12/1980 | Hard | |
| 4,432,881 A | 2/1984 | Evani | |
| 4,472,297 A * | 9/1984 | Bolich, Jr. | A61K 8/34 510/121 |
| 4,541,935 A | 9/1985 | Constien et al. | |
| 4,556,495 A | 12/1985 | Shaw | |
| 4,615,825 A | 10/1986 | Teot et al. | |
| 4,617,995 A | 10/1986 | Lau | |
| 4,725,372 A | 2/1988 | Teot et al. | |
| 4,735,731 A | 4/1988 | Rose et al. | |
| 4,814,096 A | 3/1989 | Evani | |
| 5,099,923 A | 3/1992 | Aften et al. | |
| 5,124,363 A * | 6/1992 | Stern | A62D 1/0071 252/3 |
| 5,152,906 A | 10/1992 | Aften et al. | |
| 5,283,306 A | 2/1994 | Ramesh et al. | |
| 5,342,530 A | 8/1994 | Aften | |
| 5,364,551 A * | 11/1994 | Lentsch et al. | 510/100 |
| 5,510,306 A | 4/1996 | Murray | |
| 5,551,516 A | 9/1996 | Norman et al. | |
| 5,566,760 A | 10/1996 | Harris | |
| 5,573,709 A | 11/1996 | Wells | |
| 5,603,841 A | 2/1997 | Kerr | |
| 5,604,189 A * | 2/1997 | Zhang et al. | 510/112 |
| 5,648,584 A | 7/1997 | Murray | |
| 5,648,585 A | 7/1997 | Murray et al. | |
| 5,677,101 A * | 10/1997 | Noguchi et al. | 430/166 |
| 5,763,548 A | 6/1998 | Matyjaszewski et al. | |
| 5,849,960 A | 12/1998 | Singleton et al. | |
| 5,964,295 A | 10/1999 | Brown et al. | |
| 5,965,502 A | 10/1999 | Balzer | |
| 5,979,555 A | 11/1999 | Gadberry et al. | |
| 6,077,887 A | 6/2000 | Thuresson | |
| 6,150,222 A | 11/2000 | Gardner et al. | |
| 6,153,705 A | 11/2000 | Corpart et al. | |
| 6,222,077 B1 | 4/2001 | Singleton | |
| 6,232,274 B1 | 5/2001 | Hughes et al. | |
| 6,258,859 B1 * | 7/2001 | Dahayanake et al. | 516/77 |
| 6,262,206 B1 | 7/2001 | Nesvadba et al. | |
| 6,407,187 B1 | 6/2002 | Matyjaszewski et al. | |
| 6,605,570 B2 * | 8/2003 | Miller | C09K 8/685 166/278 |
| 6,642,318 B1 | 11/2003 | Chiefari et al. | |
| 6,719,967 B1 * | 4/2004 | Brown et al. | 424/70.1 |
| 6,747,111 B2 | 6/2004 | Chiefari et al. | |
| 6,908,888 B2 | 6/2005 | Lee et al. | |
| 7,115,546 B2 | 10/2006 | Qu et al. | |
| 7,144,844 B2 | 12/2006 | Qu et al. | |
| 7,157,409 B2 | 1/2007 | Horton et al. | |
| 7,183,239 B2 | 2/2007 | Smith et al. | |
| 7,279,446 B2 | 10/2007 | Colaco et al. | |
| 7,287,593 B2 | 10/2007 | Hutchins et al. | |
| 7,351,681 B2 | 4/2008 | Reddy et al. | |
| 7,427,583 B2 * | 9/2008 | Couillet et al. | 507/211 |
| 8,439,115 B2 * | 5/2013 | Morris | C09K 8/528 166/270.1 |
| 2001/0020531 A1 | 9/2001 | Varadaraj et al. | |
| 2002/0161087 A1 | 10/2002 | Heitz et al. | |
| 2002/0169085 A1 * | 11/2002 | Miller | C09K 8/685 507/200 |
| 2003/0134751 A1 | 7/2003 | Lee et al. | |
| 2005/0107503 A1 | 5/2005 | Couillet et al. | |
| 2006/0019836 A1 * | 1/2006 | Li et al. | 507/240 |
| 2006/0027369 A1 | 2/2006 | Baycroft et al. | |
| 2006/0105919 A1 * | 5/2006 | Colaco et al. | 507/209 |
| 2006/0128597 A1 | 6/2006 | Chen et al. | |
| 2006/0229231 A1 * | 10/2006 | Chen et al. | 510/499 |
| 2007/0089881 A1 | 4/2007 | Hutchins et al. | |
| 2008/0119374 A1 | 5/2008 | Willberg et al. | |
| 2008/0269081 A1 * | 10/2008 | Lin et al. | 507/209 |
| 2009/0107681 A1 | 4/2009 | Hough et al. | |
| 2009/0111716 A1 | 4/2009 | Hough et al. | |

FOREIGN PATENT DOCUMENTS

| | | |
|---|---|---|
| CA | 2575501 A1 | 6/2006 |
| EP | 2205826 | 7/2010 |
| WO | 8701758 | 3/1987 |
| WO | 9630421 | 10/1996 |
| WO | 9701478 | 1/1997 |
| WO | 9856497 | 12/1998 |
| WO | 9858974 | 12/1998 |
| WO | 9903894 | 1/1999 |
| WO | 9931144 | 6/1999 |
| WO | 2009058589 A3 | 5/2009 |
| WO | 2009058590 A3 | 5/2009 |

OTHER PUBLICATIONS

Ullmann's Encyclopedia of Industrial Chemistry, 5th, Completely Revised Ed., vol. A 10: Ethanolamines to Fibers, 4. Synthetic Organic, Edited by Wolfgang Gerhartz et al, copyright 1987, VCH Verlagsgesellschaft mbH, D-6940 Weinheim, Fed. Rep. of Germany (Received date: May 1994), pp. 176-177 and 231-232.*

Industrial Gums Polysaccharides and Their Derivatives Second Edition, edited by Whistler and BeMiller, (Academic press, NY, NY, copyright 1973) pp. 310-311 (Nov. 1973).*

Flick, E.W.. (1991). Water-Soluble Resins—An Industrial Guide (2nd Edition)—Aqualon. William Andrew Publishing/Noyes. Online version available at: http://app.knovel.com/hotlink/pdf/id:kt001B2F72/water-soluble-resins/aqualon , pp. 67-69 (downloaded Oct. 16, 2015).*

Non-final Office action mailed Aug. 20, 2009 in U.S. Appl. No. 12/253,934 (6 pages), corresponds to US PGBPUB 2009/0107681 A1, Publ. on Apr. 30, 2009.

Written Opinion of the International Searching Authority in International Application No. PCT/US2008/080399 mailed Apr. 28, 2009, (8 pages), Publ. as WO 2009058590 A2 on May 7, 2009.

Written Opinion of the International Searching Authority in International Application No. PCT/US2008/080396 mailed Apr. 28, 2009, (8 pages), Publ. as WO 2009058589 A2 on May 7, 2009.

Extended European Search Report from EP patent application No. 08844629.0, mailed May 31, 2011.

Office Action of Jan. 27, 2015 from Canadian Patent Application No. 2,704,171 to Rhodia Inc.

Office Action of Dec. 1, 2015 from Canadian Patent Application No. 2,704,171 to Rhodia Inc.

* cited by examiner

ADDITION OF ZWITTERIONIC SURFACTANT TO WATER SOLUBLE POLYMER TO INCREASE THE STABILITY OF THE POLYMERS IN AQUEOUS SOLUTIONS CONTAINING SALT AND/OR SURFACTANTS

CROSS-REFERENCE TO RELATED APPLICATIONS

This claims the benefit of U.S. provisional patent application No. 60/984,183 filed Oct. 31, 2007 incorporated herein by reference.

FIELD OF THE INVENTION

This invention relates to a blend of a zwitterionic surfactant and an aqueous solution containing a water soluble polymer. The zwitterionic surfactant increases the polymer's resistance to salt and/or surfactant. The invention can assist in recovering hydrocarbon from a subterranean formation as well as other uses. For example, the compositions can be used in fluids for hydraulic fracturing of subterranean formations or fluids used in chemical flooding of subterranean formations. For the purposes of the present specification, the term zwitterionic includes purely zwitterionic surfactants that have a permanently positively charged moiety in the molecule regardless of the pH and a negatively charged moiety over a certain range of pH. The term zwitterionic does not include amphoteric surfactants that have a positively charged moiety at a certain pH range (e.g. typically moderately acidic) and a negatively charged moiety at a different pH range (e.g. typically slightly alkaline).

BACKGROUND OF THE INVENTION

To recover hydrocarbons from hydrocarbon-bearing subterranean geologic formations a wellbore is drilled into the formation to provide a flow path for the hydrocarbons from a reservoir within the formation to the surface. However, often a stimulation technique referred to as hydraulic fracturing is needed to improve the flow path and recovery of the hydrocarbon from oil or gas wells.

In hydraulic fracturing a specialized fluid is pumped into the targeted formation at a rate in excess of what can be dissipated through the natural permeability of the formation rock. The specialized fluids used in the technique are referred to fracturing fluids. The fluids result in a pressure build up until such pressure exceeds the strength of the formation rock. When this occurs, the formation rock fails and a so-called "fracture" is initiated. With continued pumping, the fracture grows in length, width and height. The fracture, which is generated by the application of this stimulation technique, creates a conductive path to the wellbore for the hydrocarbon.

Ideally, fracturing fluids should impart a minimal pressure drop in the pipe within the wellbore during placement and have an adequate viscosity to carry proppant material that prevents the fracture from closing. Moreover, the fracturing fluids should have a minimal leak-off rate to avoid fluid migration into the formation rocks so that, notably, the fracture can be created and propagated and should degrade so as not to leave residual material that may prevent accurate hydrocarbons to flow into the wellbore.

Typical aqueous fracturing fluids mainly consisting of "linear" polymeric gels comprising guar, guar derivatives or hydroxyethyl cellulose were introduced to attain a sufficient fluid viscosity and thermal stability in high temperature reservoirs, linear polymer gels were partially replaced by cross-linked polymer gels such as those crosslinked with borate, zirconate or titanate ions. However, as it became apparent that crosslinked polymer gel residues might damage the permeability of hydrocarbon bearing formations, fluids with a lower polymer content and foamed fluids were introduced. Also, methods were introduced to improve the clean-up of polymer-based fracturing fluids. These included advanced viscosity breaker technology in which the introduction of certain components to a fracturing fluid can cause a dramatic decrease in the fluid viscosity, called "breaking". Breaking can also occur by varying the amount of water or electrolyte or other components that may already be present in the fluid. For example, in oilfield applications, the viscosity of fracturing fluids is reduced or lost upon exposure to formation fluids (e.g., crude oil, condensate and/or water). The viscosity reduction effectuates cleanup of the reservoir, fracture, or other treated area.

A number of polymer-free aqueous fracturing fluids are based on viscoelastic surfactants. The principal advantages of viscoelastic surfactant fluids are ease of preparation, minimal formation damage and high retained permeability in the proppant pack. Viscoelastic surfactant fluids are disclosed, for example, in U.S. Pat. No. 4,615,825, U.S. Pat. No. 4,725,372, U.S. Pat. No. 4,735,731, CA-1298697, U.S. Pat. No. 5,551,516, U.S. Pat. No. 5,964,295, U.S. Pat. No. 5,979,555 and U.S. Pat. No. 6,232,274. One well-known polymer-free aqueous fracturing fluid comprising a viscoelastic surfactant, which has been commercialized by the company group Schlumberger under the trademark ClearFRAC, and a mixture of a quaternary ammonium salt, the N-erucyl-N,N-bis(2-hydroxyethyl)-N-methyl ammonium chloride, with isopropanol and brine, the brine preferably including 3% by weight of ammonium chloride and 4% by weight of potassium chloride.

Published PCT application WO 87/01758 entitled "Hydraulic Fracturing Process and Compositions" discloses fracturing processes which use aqueous hydraulic fracturing fluids. The fluids comprise: (a) an aqueous medium, and (b) a thickening amount of a thickener composition comprising (i) a water-soluble or water-dispersible interpolymer having pendant hydrophobic groups chemically bonded thereto, (ii) a nonionic surfactant having a hydrophobic group(s) that is capable of associating with the hydrophobic groups on said organic polymer, and (iii) a water-soluble electrolyte. Additionally, the fluids preferably contain a stabilizing amount of a thiosulfate salt. As an example, an interpolymer of acrylamide and dodecyl acrylate was used in combination with a nonionic surfactant (HLB of from 10 to 14) to thicken a dilute aqueous solution of KCl and sodium thiosulfate; the aqueous solution had excellent properties for use as a high temperature hydraulic fracturing fluid.

U.S. Pat. No. 4,432,881 entitled "Water-Dispersible Hydrophobic Thickening Agent" discloses an aqueous liquid medium having increased low shear viscosity as provided by dispersing into the aqueous medium (1) a water-soluble polymer having pendant hydrophobic groups, e.g., an acrylamide dodecyl acrylate copolymer, and (2) a water-dispersible surfactant, e.g., sodium oleate, or dodecyl polyethyleneoxy glycol monoether. The thickened aqueous medium is suitably employed in applications requiring viscous liquids which retain their viscosity when subjected to shear, heat or high electrolyte (salt) concentrations. Such applications include uses in oil recovery processes, as fluid mobility control agents, fracturing fluids and drilling muds, as well as hydraulic fluids and lubricants in many applications.

Also, U.S. Pat. No. 5,566,760 entitled "Method of Using a Foamed Fracturing Fluid" discloses a fracturing fluid comprising surfactants and hydrophobically-modified polymers. In these fluids, surfactant molecules form the interface between gas bubbles and the polymer molecules that form a polymeric network similar to those of the pure polymeric fluids. Still, there is no mention of viscoelastic surfactants or of the responsiveness of the fluids to hydrocarbons.

United States Patent Application Publication 2003/0134751 discloses addition of polymers to a viscoelastic surfactant base system allows adjusting the rheological properties of the base fluid. The polymer can perform different functions (breaker, viscosity enhancer, or viscosity recovery enhancer) depending upon its molecular weight and concentration in the fluid. The methods and compositions are presented for adjusting the viscosity of viscoelastic surfactant fluids based on anionic, cationic, nonionic and zwitterionic surfactants.

United States Patent Application Publication 2005/0107503 A1 describes an aqueous viscoelastic fracturing fluid for use in the recovery of hydrocarbons. The fluid comprises a viscoelastic surfactant and a hydrophobically modified polymer. The viscoelastic surfactant is usually ionic. It may be cationic, anionic or zwitterionic depending on the charge of its head group.

A problem in using water-soluble polymers, such as polyelectrolyte and hydrophobically modified polyelectrolyte polymers, to modify the viscosity of fracturing fluids is that polyelectrolyte and hydrophobically modified polyelectrolyte polymers typically have a low resistance to salt. Salt typically causes a breakdown in the viscosity and stability of these polymers in aqueous solutions. In addition, the viscosity of hydrophobically modified polyelectrolyte polymers typically breaks down in the presence of surfactants.

It would be desirable to use such water soluble polymers to increase viscosity of fracturing fluids in subterranean formations, such as natural gas and/or oil fields, if this viscosity breakdown could be controlled. This breakdown is also disadvantageous in a number of other environments in which such water soluble polymers would otherwise be useful, such as personal care products or as fluid loss agents for cement.

In addition to fracturing, other techniques may be employed to further improve hydrocarbon recovery from subterranean formations. Initially, oil is produced from the fractured formation by pressure depletion (primary recovery). In this method, the differential pressure between the formation and a production well or wells forces the oil contained within the formation toward a production well where it can be recovered. Traditionally secondary recovery processes through injection of water or gas are used to displace additional oil toward producing wells. Typically, up to about 35 percent of the oil which is initially contained in a formation can be recovered in average through primary and secondary recovery. This leaves a large quantity of oil within the formation. Additionally, some formations contain oil which is too viscous to be efficiently recovered from the formation using primary and secondary processes. Because of the need to recover a larger percentage of the oil from a formation, methods have been developed to recover oil which could not be recovered using only pressure depletion techniques. These methods are typically referred to as "enhanced oil recovery techniques" (EOR).

Among the more promising of the methods being used today is an enhanced oil recovery process referred to as chemical flooding which generally covers the use of polymer and/or surfactant slugs. In polymer flooding, a polymer solution is injected to displace oil toward producing wells. The polymer solution is designed to develop a favorable mobility ratio between the injected polymer solution and the oil/water bank being displaced ahead of the polymer. However, the use of polymer is not always satisfactory as many polymer solutions are sensitive to brine type and concentration which can affect the apparent viscosity of the solution. In surfactant flooding, an aqueous solution containing surfactant is injected into the oil rich formation. Residual oil drops are deformed as a result of low Interfacial Tension provided by surfactant solution and drops are displaced through the pore throats and displaced oil is the recovered.

SUMMARY OF THE INVENTION

Figure 1:
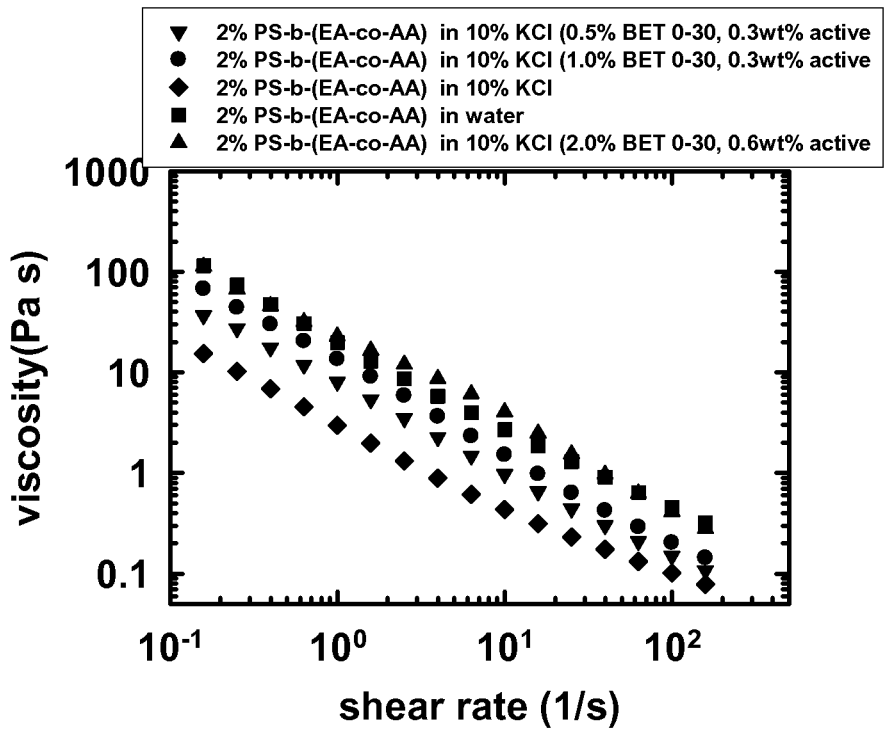
FIG. 1 and FIG. 2 show the viscosity as a function of shear rate for a 2 wt % PS-b-(EA-co-AA) diblock solution in 10% KCl, at various levels of betaine surfactant in Example 1.

The composition of the present invention comprises a mixture of water, a water soluble polymer, and at least one zwitterionic surfactant, wherein the composition has a water soluble polymer concentration of 0.05 to 20 weight % on a wet basis, a total concentration of a zwitterionic surfactant of 0.01 to 10 weight % on a wet basis, and inorganic salt containing mono- and/or di-valent and/or tri-valent ions from about 0.01 to about 20 wt %. The water soluble polymer can be charged or uncharged.

Some uses of the composition of the present invention include, thickening agents for home care products, liquid laundry detergents, drain cleaners, hard surface cleaners, automatic dishwasher fluids, fracturing fluids in oil and gas fields, enhanced oil recovery fluids, hydraulic fracturing fluids, thickening hair gels, gel deodorant, and other personal care applications, as well as a fluid loss agent in cement, gas field and/or oil field applications. The invention is particularly relevant for chemical flooding in enhanced oil recovery (EOR). It targets more precisely the improvement of electrolytic stability of polymeric solutions. The invention improves performance of polymer slugs (also called mobility control agents). The polymer slug can be used alone or can be combined with surfactant for example, when used for surfactant-polymer flooding or alkaline surfactant-polymer flooding.

For example, the present aqueous fluid is useful to aid in the recovery of hydrocarbons from a subterranean formation. If desired the fracturing fluid composition comprises a mixture of brine, the water soluble polymer, and at least one zwitterionic surfactant, wherein the water soluble polymer comprises a polyelectrolyte and the composition has a polyelectrolyte concentration of 0.05 to 20 weight % on a wet basis.

The present compositions contain little or no anionic surfactant. Preferably there is less than 0.5 wt. %, more preferably less than 0.3 wt. %, anionic surfactant on a wet basis.

The addition of the zwitterionic results in the protection or recovery of the viscosity and/or the viscoelastic properties of water soluble polymers in the presence of salt. The amount of salt varies depending on the use. Typically, the addition of this surfactant can assist in the protection or recovery of the viscosity and/or the viscoelastic properties of water soluble polymers in the presence of 1 to 20% of mono or divalent salts.

The present invention overcomes a limitation of aqueous solutions containing water soluble polymers, for example, polyelectrolyte and\or hydrophobically modified polyelectrolyte polymers, namely their poor resistance to salts. The addition of the zwitterionic surfactant provides a resistance to salts and surfactants as measured by rheology. A full recovery of the viscosity is observed with the addition of the zwitterionic surfactant.

Unless otherwise indicated all percents relating to composition are weight percents and all average molecular weights are weight average molecular weights.

As used herein, the notation "($C_n$-$C_m$)" in reference to an organic group or compound, wherein n and m are integers, means that the group or compound contains from n to m carbon atoms per such group or compound.

As used herein, the term "alkyl" means a monovalent saturated straight chain or branched hydrocarbon radical, typically a monovalent saturated ($C_1$-$C_{30}$)hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl.

As used herein, the term "hydroxyalkyl" means an alkyl radical that is substituted on one of its carbon atoms with a hydroxyl group, such as As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "cycloalkyl" means a saturated cyclic hydrocarbon radical, typically a ($C_3$-$C_8$) saturated cyclic hydrocarbon radical, such as, for example, cyclohexyl or cyclooctyl, which may optionally be substituted on one or more of the carbon atoms of the radical.

As used herein, the term "alkenyl" means an unsaturated straight chain, branched chain, or cyclic hydrocarbon radical that contains one or more carbon-carbon double bonds, such as, for example, ethenyl, 1-propenyl, or 2-propenyl, which may optionally be substituted on one or more of the carbon atoms of the radical.

As used herein, the term "aryl" means a monovalent unsaturated hydrocarbon radical containing one or more six-membered carbon rings in which the unsaturation may be represented by three conjugated double bonds, such as for example, phenyl, naphthyl, anthryl, phenanthryl, or biphenyl, which may optionally be substituted one or more of carbons of the ring. In one embodiment, an aryl radical is substituted on one or more carbon atoms of the radical with hydroxyl, alkenyl, halo, haloalkyl, or amino, such as, for example, methylphenyl, dimethylphenyl, hydroxyphenyl, chlorophenyl, trichloromethylphenyl, or aminophenyl.

As used herein, the term "aryloxy" means an oxy radical that is substituted with an aryl group, such as for example, phenyloxy, methylphenyl oxy, isopropylmethylphenyloxy.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, alkenyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

DETAILED DESCRIPTION OF THE INVENTION

The composition of the present invention comprises a mixture of water, a water soluble polymer, and a zwitterionic surfactant and inorganic salt containing mono- and/or di-valent and/or trivalent ions.

The most preferred compositions of the present invention contain a mixture of water, a water soluble polymer, inorganic salt and combinations of zwitterionic surfactants and are essentially free of anionic surfactants.

The relative amounts of the above-named components in the composition can be varied. Typically the composition has 0.05 to 20 wt % water soluble polymer, 0.01 to 10 wt % zwitterionic surfactant, and 0.1 to 20 wt % % inorganic salt containing mono- and/or di-valent and/or trivalent ions on a wet basis. The water-soluble mono- and/or di-valent electrolyte is typically used in amounts of from about 1 weight percent to about 15 weight percent, or about 1 to 10 weight percent, of the aqueous composition, based on weight of aqueous composition (a wet basis).

The relative amounts of the above-named components in the composition can be varied. However, typical ranges for water soluble polymer and zwitterionic surfactant of the overall compositions of embodiments of the present invention on a wet basis are listed in TABLE 1.

TABLE 1

|  | Water Soluble Polymer | Zwitterionic Surfactant | Inorganic salt |
|---|---|---|---|
| Weight Percent (Broad) | 0.05-20 | 0.01-10 | 0.1 to 20 |
| Weight Percent (Preferred) | 0.1-10 | 0.08-3 |  |

TABLE 1-continued

|  | Water Soluble Polymer | Zwitterionic Surfactant | Inorganic salt |
|---|---|---|---|
| Weight Percent (More Preferred) | 0.3-3 | 0.1-2 |  |
| Polymer Weight Average Molecular Weight (Broad) | 5000 g/mol-20,000,000, g/mol |  |  |
| Polymer Weight Average Molecular Weight (preferred) | 5000 g/mol-10,000,000 g/mol |  |  |

The water-soluble inorganic salt contains mono- and/or di-valent and/or trivalent ions. Inorganic salt concentration is typically used in amounts of from about 0.1 weight percent to about 20 weight percent or about 1 weight percent to about 15 weight percent, based on weight of aqueous medium, for example in amounts of from about 1 to 10 weight percent.

I. Water Soluble Polymers

A component of the present composition is a water soluble polymer. For purposes of the present specification, a water soluble polymer is defined as any polymer soluble in water without the aid of a solubilizing agent.

The water soluble polymer can be charged or uncharged. Examples of uncharged water-soluble polymer include one or more of polyethylene glycol (PEG), polypropylene glycol (PPG), block co-polymers of PEG and PPG.

Polyelectrolyte water soluble polymers useful in the invention may be anionic, cationic or zwitterionic. Typical polyelectrolyte water soluble polymers may be one or more of the following: sulfonated polynapthalenes, sulfonated polystyrenes and sulfonated styrene/maleic anhydride polymers.

Hydrophobically modified polyelectrolyte polymers are also included under the term water soluble polymers as well as under the term polyelectrolytes. Hydrophobically modified polyelectrolyte polymers are water-soluble polymers having pendant hydrophobic groups chemically bonded thereto.

The water soluble polymers are usually polymers having a number average molecular weight of between 5 kg/mol and 20,000 kg/mol, typically 10 kg/mol and 10,000 kg/mol, for example 5 kg/mol-200 kg/mol or 10 kg/mol-100 kg/mol.

Preferably the water soluble polymers are polyacrylic acid and polyacrylic acid derivatives such as polystyrene-polyacrylic diblock polymers, and polyacrylic acid polymers containing at least one hydrophobic moiety in the structure.

A family of suitable water soluble polymers are the water soluble block copolymers.

The water soluble block copolymers comprise at least one block water-soluble in nature and containing hydrophobic units and at least one block predominantly hydrophobic in nature. Information about these block copolymers is provided by US Patent No. 2002/0161087 A1 to Heitz et al. incorporated herein by reference in its entirety.

According to a first embodiment, the copolymer contains only a single hydrophobic block and a single water-soluble block. According to another embodiment, the copolymer contains a water-soluble block having a hydrophobic group at each end or the copolymer contains a hydrophobic block having a water-soluble group at each end.

In the description which follows, the expression "block water-soluble in nature" should be understood to mean a polymer block containing a number of hydrophilic groups sufficient to obtain a water soluble block well dissolved in water. Solubility in water of the water soluble block means a block copolymer containing such a water soluble block, when mixed with water, gives a translucent monophasic system. Usually such a translucent monophasic system is obtained from a water soluble block comprising at least 30%, preferably at least 50% by weight of hydrophilic units with respect to the totality of units of the water-soluble block. The block water-soluble in nature is therefore soluble in water.

The term "unit" should be understood to mean that part of the block corresponding to a monomeric unit.

Likewise, the expression "block predominantly hydrophobic in nature" should be understood to mean a polymer block preferably containing at least 67% by weight hydrophobic units with respect to the totality of units. The block predominantly hydrophobic in nature is not soluble in water. This block copolymer containing at least one block water-soluble in nature and at least one block predominantly hydrophobic in nature forms a viscoelastic gel when it is in solution in water.

The term "viscoelastic gel" should be understood to mean a liquid medium for which the viscous modulus G" and the elastic modulus G' are such that G'>G" at oscillation frequencies less than 500 rad/s. This gel behavior is manifested by a flow threshold and even, in some cases, by a shear-thickening effect (an increase in the viscosity with flow). This gel effect is obtained when the polymer concentration exceeds a certain threshold called the critical gelling concentration.

The block copolymers have the advantage of making the aqueous media viscoelastic when they are used in only a small amount with respect to the aqueous medium. The copolymer may be used at a concentration from about 0.05 to 10% by weight of aqueous composition, typically 0.1 to 4 wt. % or 0.3 to 2 wt. %. For example, in hydraulic fluid the copolymer may be used at a concentration higher than 0.1% by weight, more particularly between 0.5 and 10% by weight and even more preferably at a concentration from 1 to 5% by weight.

According to one embodiment of the water soluble block copolymers, the weight ratio of the block water-soluble in nature to the completely hydrophobic block is between 95/5 and 20/80, even more preferably between 90/10 and 40/60.

According to a first version of the preparation of the water soluble block copolymers, the blocks water-soluble in nature and the blocks predominantly hydrophobic in nature of the above copolymers may come from the copolymerization of hydrophilic and hydrophobic monomers. The amounts of hydrophilic and hydrophobic units in each of the blocks can then be controlled by the respective contents of hydrophilic monomers and hydrophobic monomers during the polymerization of the blocks.

Thus, the blocks predominantly hydrophobic in nature may come from the copolymerization of hydrophobic monomers and of hydrophilic monomers, the hydrophilic monomers being present in an amount of less than 33% by weight, preferably at least 1% by weight, even more preferably between 2 and 15%, with respect to the total weight of the units of the hydrophobic block. If desired, the blocks predominantly hydrophobic in nature are a completely hydrophobic blocks.

In addition, the blocks water-soluble in nature may come from the copolymerization of hydrophilic monomers and of hydrophobic monomers, the hydrophobic monomers being present in an amount of less than 70% by weight, preferably at least 1% by weight, even more preferably between 50 and 10%, with respect to the total weight of the units of the water-soluble block.

According to a second version of the preparation of the water soluble block copolymers, the blocks water-soluble in nature may come from the polymerization of monomers that may be rendered hydrophilic by hydrolysis and optionally of non-hydrolysable hydrophobic monomers and/or of hydrophilic monomers, and then from the hydrolysis of the polymer obtained. During the hydrolysis, the units corresponding to the hydrolysable monomers are hydrolyzed into hydrophilic units. The amounts of hydrophilic and hydrophobic units in each of the blocks are then controlled by the amount of each type of monomer and by the degree of hydrolysis. According to this second version, various methods of implementation may be envisaged.

According to a first method of implementation, the blocks may be obtained by: homopolymerization of hydrophobic monomers that can be rendered hydrophilic by hydrolysis and partial hydrolysis of the homopolymer obtained to a degree such that what is obtained is: either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block, or, in the case of the blocks water-soluble in nature, an amount of hydrophobic units of less than 70% by weight, preferably at least 1% by weight, even more preferably between 25 and 50%, with respect to the total weight of the units of the water-soluble block.

According to a second method of implementation, the blocks may be obtained by: copolymerization of hydrophobic monomers that can be rendered hydrophilic by hydrolysis and of hydrophobic monomers that cannot be rendered hydrophilic by hydrolysis and then complete or partial hydrolysis of the polymer obtained. According to this second method of implementation, the amount of hydrophilic and hydrophobic units may depend on two criteria, namely the content of the various types of monomers and the degree of hydrolysis.

If there is complete hydrolysis, then it is sufficient to vary the content of the monomers and thus:
- the blocks predominantly hydrophobic in nature can come: from the polymerization of a mixture of hydrophobic monomers that can be rendered hydrophilic by hydrolysis and of hydrophobic monomers that cannot be rendered hydrophilic by hydrolysis, the hydrophobic monomers that can be rendered hydrophilic by hydrolysis being present in an amount of less than 33% by weight, preferably at least 1% by weight, even more preferably between 2 and 15%, with respect to the total weight of the units of the hydrophobic block, and then, from the complete hydrolysis of the polymer obtained;
- the blocks water-soluble in nature may come: from the polymerization of a mixture of hydrophobic monomers that can be rendered hydrophilic by hydrolysis and of hydrophobic monomers that cannot be rendered hydrophilic by hydrolysis, the hydrophobic monomers that cannot be rendered hydrophilic by hydrolysis being present in an amount of less than 50% by weight, preferably at least 1% by weight, even more preferably between 49 and 10%, with respect to the total weight of the units of the hydrophobic block, and then from the complete hydrolysis of the polymer obtained.

If there is partial hydrolysis, the monomer content and the degree of hydrolysis may be varied at the same time.

According to a third method of implementation, the blocks may be obtained by:
copolymerization of hydrophobic monomers that can be rendered hydrophilic by hydrolysis and of hydrophilic monomers and then
partial hydrolysis of the polymer obtained to a degree such that what is obtained is:
- either, in the case of the blocks predominantly hydrophobic in nature, an amount of hydrophilic units of less than 33% by weight, preferably at least 1% by weight, even more preferably between 2 and 15%, with respect to the total weight of the units of the hydrophobic block,
- or, in the case of the blocks water-soluble in nature, an amount of hydrophobic units of less than 70% by weight, preferably at least 1% by weight, even more preferably between 50 and 10%, with respect to the total weight of the units of the water-soluble block.

In general, the hydrophobic monomers may be chosen from: vinylaromatic monomers, such as styrene, dienes, such as butadiene, alkyl acrylates and methacrylates the alkyl group of which contains from 1 to 10 carbon atoms, such as methyl, ethyl, n-butyl, 2-ethylhexyl, tert-butyl, isobornyl, phenyl and benzyl acrylates and methacrylates. Preferably, it is styrene.

The hydrophilic monomers may be chosen from: ethylenically unsaturated carboxylic acids such as acrylic and methacrylic acids; neutral hydrophilic monomers such as acrylamide and its derivatives (N-methylacrylamide, N-isopropylacrylamide), methacrylamide, polyethylene glycol methacrylate and polyethylene glycol acrylate; anionic hydrophilic monomers: sodium 2-acrylamido-2-methylpropanesulphonate (SAMPS), sodium styrenesulphonate and sodium vinylsulphonate.

The monomers that can be rendered hydrophilic by hydrolysis may be chosen from: acrylic and methacrylic esters hydrolysable in acid, such as methyl acrylate, ethyl acrylate, hydroxyethyl methacrylate, hydroxyethyl acrylate and tert-butyl acrylate; vinyl acetate hydrolysable into vinyl alcohol units; quaternized 2-dimethylaminoethyl methacrylate and acrylate (quatdamma and quatdama); acrylamide and (meth)acrylamide.

Preferably, the block copolymers according to the invention are diblock copolymers. However, they may also be triblock, or even multiblock copolymers. For example, the block copolymers may be a triblock copolymer having a block water-soluble in nature flanked by two blocks predominantly hydrophobic in nature, or a triblock copolymer having a block predominantly hydrophobic in nature flanked by two blocks water-soluble in nature. If the copolymer comprises three blocks, it is preferable to have a block water-soluble in nature flanked by two blocks predominantly hydrophobic in nature.

According to a particular embodiment, the copolymer is a diblock copolymer comprising a block water-soluble in nature and a block predominantly hydrophobic in nature, in which: the block water-soluble in nature contains acrylic acid (AA) units and ethyl acrylate (EtA) units and the block predominantly hydrophobic in nature contains styrene (St) units and methacrylic acid (MAA) and/or hydroxyethyl methacrylate (HEMA) units.

Preferably, according to this embodiment, the block water-soluble in nature comes: from the polymerization of methacrylic acid (MAA) and of ethyl acrylate (EtA) in an EtA/MAA weight ratio from 90/10 to 99/1, and then from the hydrolysis of the polymer obtained to a degree of at least 50 mol % up to 95%.

Preferably, the block predominantly hydrophobic in nature comes from the polymerization of a monomer mixture comprising at least 80% by weight styrene.

Generally, the block copolymers according to the invention have a molecular mass of at most 200,000 g/mol, for example at most 100,000 g/mol, preferably at least 5000 g/mol.

In general, the above block copolymers can be obtained by any so-called living or controlled polymerization process such as, for example:
radical polymerization controlled by xanthates according to the teaching of Application WO 98/58974,
radical polymerization controlled by dithioesters according to the teaching of Application WO 97/01478,
polymerization using nitroxide precursors according to the teaching of Application WO 99/03894,
radical polymerization controlled by dithiocarbamates according to the teaching of Application WO 99/31144,
atom transfer radical polymerization (ATRP) according to the teaching of Application WO 96/30421,
radical polymerization controlled by iniferters according to the teaching of Otu et al., Makromol. Chem. Rapid. Commun., 3, 127 (1982),
radical polymerization controlled by degenerative iodine transfer according to the teaching of Tatemoto et al., Jap. 50, 127, 991 (1975), Daikin Kogyo Co Ltd., Japan and Matyjaszewski et al., Macromolecules, 28, 2093 (1995),
group transfer polymerization according to the teaching of O. W. Webster "Group Transfer Polymerization", pp. 580-588 in "Encyclopedia of Polymer Science and Engineering", vol. 7 and H. F. Mark, N. M. Bikales, C. G. Overberger and G. Menges, Publ., Wiley Interscience, New York, 1987,
radical polymerization controlled by tetraphenylethane derivatives (D. Braun et al., Macromol. Symp. 111, 63 (1996)), and
radical polymerization controlled by organocobalt complexes (Wayland et al., J. Am. Chem. Soc. 116, 7973 (1994)).

The preferred polymerization is living radical polymerization using xanthates.

II. Zwitterionic Surfactants

The surfactant of the viscoelastic composition of the present invention may comprise zwitterionic surfactant. Typically, the zwitterionic surfactant will comprise from about 0.01% to about 10% weight percent, preferably from about 0.08% to about 3 wt %, based on the total weight of the composition.

The term "zwitterionic surfactant" as utilized herein encompasses one or more zwitterionic surfactants such as mixtures of zwitterionic surfactants. Also, for the purposes of the present specification, the term zwitterionic include surfactants that have a permanently positively charged moiety in the molecule regardless of the pH and a negatively charged moiety over a certain range of pH. This differs from amphoteric surfactants that have a positively charged moiety at a certain pH range (e.g. typically moderately acidic) and a negatively charged moiety at a different pH range (e.g. typically slightly alkaline).

Examples of suitable zwitterionic surfactants include; alkyl betaines, alkyl ether hydroxyl propyl sultaines, alkyl dimethy betaines, alkyl amidopropyl betaine, alkyl sultaines and alkylamidopropylhydroxy sultaines wherein alkyl represents an alkyl group having 6 to 22 carbon atoms. Other types of zwitterionic surfactants useful in the present invention include, but are not limited to, dihydroxyl alkyl glycinate, and dicarboxilic imidazoline derivatives. Other examples of such zwitterionic surfactants include, but are not limited to, alkylether hydroxypropyl sultaine, cocoamphoacetate, cocamidopropyl hydroxy sultaine, sodium laurylamino dipropionate, or any mixture thereof.

Other zwitterionic surfactants suitable for use in the present invention are exemplified by those which can be broadly described as derivatives of aliphatic quaternary ammonium, phosphonium, and sulfonium compounds, in which the aliphatic radicals can be straight or branched chain, and wherein one of the aliphatic substituents contains from about 8 to about 18 carbon atoms and one contains an anionic group, e.g., carboxy, sulfonate, sulfate, phosphate, or phosphonate. A general formula for these compounds is herein listed formula I found in U.S. Pat. No. 5,573,709, which is incorporated herein by reference,

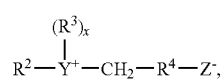

$$R^2-Y^+-CH_2-R^4-Z^-, \quad \overset{(R^3)_x}{|} \quad I$$

wherein $R^2$ contains an alkyl, alkenyl, or hydroxy alkyl radical of from about 8 to about 22 carbon atoms, from 0 to about 10 ethylene oxide moieties and from 0 to about 1 glyceryl moiety; Y is selected from the group consisting of nitrogen, phosphorus, and sulfur atoms; $R^3$ is an alkyl or monohydroxyalkyl group containing about 1 to about 3 carbon atoms; X is 1 when Y is a sulfur atom, and 2 when Y is a nitrogen or phosphorus atom; $R^4$ is an alkylene or hydroxyalkylene of from about 1 to about 4 carbon atoms and Z is a radical selected from the group consisting of carboxylate, sulfonate, sulfate, phosphonate, and phosphate groups.

Examples of such surfactants include:
4-[N,N-di(2-hydroxyethyl)-N-octadecylammonio]-butane-1-carboxylate;
5-[S-3-hydroxypropyl-5-hexadecylsulfonio]-3-hydroxypentane-1-sulfate;
3-[P,P-diethyl-P-3,6,9-trioxatetradexocylphosphonio]-2-hydroxy-propane-1-phosphate;
3-[N,N-dipropyl-N-3-dodecoxy-2-hydroxypropylammonio]-propane-1-phosphonate;
3-(N,N-dimethyl-N-hexadecylammonio)propane-1-sulfonate;
3-(N,N-dimethyl-N-hexadecylammonio)-2-hydroxypropane-1-sulfonate;
4-[N,N-di(2-hydroxyethyl)-N-(2-hydroxydodecyl)ammonio]-butane-1-carboxylate;
3-[S-ethyl-S-(3-dodecoxy-2-hydroxypropyl)sulfonio]-propane-1-phosphate;
3-[P,P-dimethyl-P-dodecylphosphonio]-propane-1-phosphonate; and
5-[N,N-di(3-hydroxypropyl)-N-hexadecylammonio]-2-hydroxy-pentane-1-sulfate.

Examples of betaines useful herein include the high alkyl betaines, such as coco dimethyl carboxymethyl betaine, cocoamidopropyl betaine, cocobetaine, lauryl amidopropyl betaine, oleyl betaine, lauryl dimethyl carboxymethyl betaine, lauryl dimethyl alpha-carboxyethyl betaine, cetyl dimethyl carboxymethyl betaine, lauryl bis-(2-hydroxyethyl) carboxymethyl betaine, stearyl bis-(2-hydroxypropyl) carboxymethyl betaine, oleyl dimethyl gamma-carboxypropyl betaine, and lauryl bis-(2-hydroxypropyl)alpha-carboxyethyl betaine.

Examples of alkyl amidopropyl betaines include, cocamidopropyl betaine, lauramidopropyl betaine, oleamidopropyl betaine and erucic amidopropyl betaine, A particularly preferred composition utilizes erucic amidopropyl betaine and/or oleamidopropyl betaine.

The sulfobetaines may be represented by coco dimethyl sulfopropyl betaine, stearyl dimethyl sulfopropyl betaine, lauryl dimethyl sulfoethyl betaine, lauryl bis-(2-hydroxyethyl) sulfopropyl betaine and the like.

Formulae for useful zwitterionic surfactants include those of the following formulas II through V:

Alkyl betaines

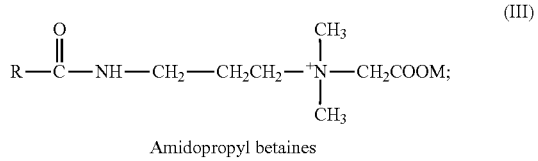

Amidopropyl betaines

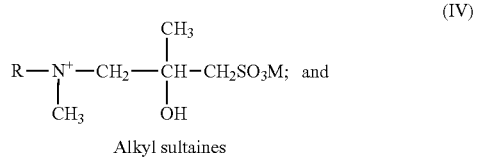

Alkyl sultaines

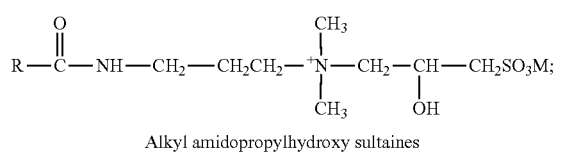

Alkyl amidopropylhydroxy sultaines wherein R is an alkyl group of 6-22 carbon atoms and M is potassium, sodium or a monovalent cation.

Also useful herein are the betaines and amidobetaines compounds of the general structure VI:

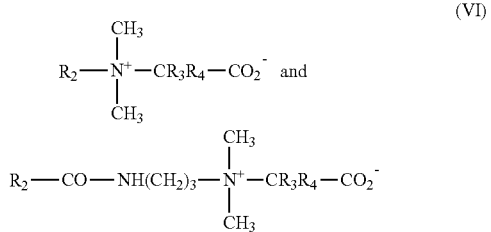

respectively wherein $R_2$ is $C_8$-$C_{22}$ alkyl or alkenyl; $R_3$ is H or $C_1$-$C_4$ alkyl; and $R_4$ is H or $C_1$-$C_4$ alkyl.

Preferably in the above Formulae II through VI, R is 16 or greater.

Surfactants with long alkyl chains, for example, C16 to C24 are preferred, C18 to C22 are more preferred.

III. Inorganic Salts

Monovalent electrolytes have a typical formula $A^+B^-$, wherein A is selected from the group consisting of sodium, potassium or other alkali metals and B is selected from the group consisting of chloride, bromide or other halogens.

Divalent electrolytes have a typical formula $A_a^{+X}B_b^{-Y}$, wherein A is selected from the group consisting of calcium, magnesium, ferrous iron and B is selected from the group consisting of chloride, bromide, sulfate, carbonate, and nitrate, a times X is +2 and b times Y is −2.

Trivalent electrolytes have a typical formula $A_a^{+X}B_b^{-Y}$, wherein A is selected from the group consisting of ferric iron (Fe3+) and B is selected from the group consisting of chloride, bromide, sulfate, carbonate, and nitrate, wherein "a" times X is +3 and "b" times Y is −3.

Suitable inorganic mono- and/or di-valent electrolytes include sodium sulfate, sodium nitrate, sodium chloride (which is preferable due to its availability and cost), sodium tripolyphosphate, sodium carbonate, magnesium chloride or potassium chloride, etc. but the monovalent metallic salts, particularly sodium chloride are preferred. The inorganic salts are present in the water in an amount within the range of about 250 to 100,000, more preferably 500 to 40,000, and still more preferably 5000 to 25,000 parts per million total dissolved solids. Other electrolytes may also be present in combination with the sodium chloride.

IV. Aqueous Medium

The aqueous medium of the composition may be soft water, brackish water or brine. Typically the aqueous medium in compositions used to treat subterranean formations comprises brine. When brine is employed it may also serve as the source of the mono- and/or di-valent ions.

V. Other Ingredients

It should be also understood that the compositions of the invention may contain components in addition to water, water soluble polymer, and at least one member of the group consisting of zwitterionic surfactants. Such additional components are, for example, co-solvents, acids, bases, buffers, chelating agents for the control of multivalent cations, freezing point depressants, etc. The zwitterionic surfactants are typically provided as an aqueous composition with a co-solvent such as one or more of Propylene Glycol, or Glycerine an alcohol, such as, isopropanol.

For example, a hydrocarbon recovery composition including water, water soluble polymer, and at least one member of the group of zwitterionic surfactants according to the present invention may be provided to the hydrocarbon containing formation alone or with other compounds for enhancing oil recovery. For example, these other compounds may be other nonionic additives (e.g., alcohols, ethoxylated alcohols and/or sugar based esters) and less than 0.3 weight percent of one or more anionic surfactants (e.g. sulfates, sulfonates, ethoxylated sulfates, and/or phosphates). Typically the composition has less than 0.3 wt % each of anionic surfactant, amphoteric surfactant and nonionic surfactant. If desired, there may be an absence of anionic surfactant, an absence of amphoteric surfactant, and an absence of nonionic surfactant.

A. Alcohol

Alcohol can be used as mutual solvent to reduce water saturation. The interfacial tension between oil and ethanol is much lower than between oil and brine.

Capillary forces of retention for the alcohol are much reduced compared to those for brine.

It has been reported that isopropyl or butyl alcohol plus methyl alcohol could be used in miscible displacement to increase oil recovery of naphtha and mineral oil.

Others have investigated enhanced oil recovery by alcohol flooding. Their process design was strongly guided by the ternary phase of alcohol/oil/brine. They showed that oil recovery was highly dependent on the choice of alcohol/oil/brine combinations. Others have reported that injection of appropriate combinations of oil-soluble and water-soluble solvents such as alcohols and ketones could significantly enhance oil recovery.

In an embodiment, an aliphatic nonionic additive, such as an aliphatic alcohol, may be used in a hydrocarbon recovery composition. As used herein, the term "aliphatic" refers to a straight or branched chain of carbon and hydrogen atoms. In some embodiments, an aliphatic portion of an aliphatic nonionic additive may have an average carbon number from 4 to 24. In some embodiments, an aliphatic portion of an aliphatic nonionic additive may have an average carbon number from 12 to 18. In some embodiments, the aliphatic nonionic additive may include a branched aliphatic portion. A branched aliphatic portion of an aliphatic nonionic additive may have an average carbon number from 16 to 17. In some embodiments, a branched aliphatic group of an aliphatic nonionic additive may have less than about 0.5 percent aliphatic quaternary carbon atoms. In an embodiment, an average number of branches per aliphatic nonionic additive ranges from about 0.1 to about 2.5. In other embodiments, an average number of branches per aliphatic nonionic additive ranges from about 0.7 to about 2.5.

Methyl branches may represent between about 20 percent to about 99 percent of the total number of branches present in the branched nonionic additive. In some embodiments, methyl branches may represent greater than about 50 percent of the total number of branches in a branched nonionic additive. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

In an embodiment, an aliphatic nonionic additive may be a long chain aliphatic alcohol. The term "long chain," as used herein, refers to a carbon chain having an average carbon number from 10 to 30. A long chain aliphatic alcohol (e.g., a long chain primary alcohol) may be purchased commercially (e.g., NEODOL® alcohols manufactured by Shell Chemical Co., Houston, Tex.). In certain embodiments, a long chain aliphatic alcohol may be prepared by a variety of generally known methods. A long chain aliphatic alcohol may have an average carbon number from 10 to 24. In some embodiments, a long chain aliphatic alcohol may have an average carbon number from 12 to 18. In other embodiments, a long chain aliphatic alcohol may have an average carbon number from 16 to 17.

In an embodiment, a portion of the long chain aliphatic alcohol may be branched. Branched long chain aliphatic alcohols may be prepared by hydroformylation of a branched olefin. Preparations of branched olefins are described in U.S. Pat. No. 5,510,306 to Murray, entitled "Process For Isomerizing Linear Olefins to Isoolefins;" U.S. Pat. No. 5,648,584 to Murray, entitled "Process For Isomerizing Linear Olefins to Isoolefins" and U.S. Pat. No. 5,648,585 to Murray, entitled "Process For Isomerizing Linear Olefins to Isoolefins," all of which are incorporated by reference herein. Preparations of branched long chain aliphatic alcohols are described in U.S. Pat. No. 5,849,960 to Singleton et al., entitled "Highly Branched Primary Alcohol Compositions, and Biodegradable Detergents Made Therefrom;" U.S. Pat. No. 6,150,222 to Singleton et al., entitled "Highly Branched Primary Alcohol Compositions, and Bio-degradable Detergents Made Therefrom;" U.S. Pat. No. 6,222,077 to Singleton et al., entitled "Highly Branched Primary Alcohol Compositions, and Biodegradable Detergents Made Therefrom," all of which are incorporated by reference herein.

In some embodiments, branches of a branched aliphatic group of a long chain aliphatic alcohol may have less than about 0.5 percent aliphatic quaternary carbon atoms. In an embodiment, an average number of branches per long chain aliphatic alcohol ranges from about 0.1 to about 2.5. In other embodiments, an average number of branches per alcohol ranges from about 0.7 to about 2.5.

Methyl branches may represent between about 20 percent to about 99 percent of the total number of branches present in the branched long chain aliphatic alcohol. In some embodiments, methyl branches may represent greater than about 50 percent of the total number of branches in a branched long chain aliphatic alcohol. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

B. Aliphatic Anionic Surfactants

At most small amounts of an aliphatic anionic surfactant may be used in a hydrocarbon recovery composition. In certain embodiments, an aliphatic portion of an aliphatic anionic surfactant may have an average carbon number from 10 to 24. In some embodiments, an aliphatic portion of an aliphatic anionic surfactant may have an average carbon number from 12 to 18. In other embodiments, an aliphatic portion of an aliphatic anionic surfactant may have an average carbon number from 16 to 17. In some embodiments, the aliphatic anionic surfactant may include a branched aliphatic portion. In some embodiments, a branched aliphatic group of an aliphatic anionic surfactant may have less than about 0.5 percent aliphatic quaternary carbon atoms. In an embodiment, an average number of branches per aliphatic anionic surfactant ranges from about 0.1 to about 2.5. In other embodiments, an average number of branches per aliphatic anionic surfactant ranges from about 0.7 to about 2.5.

Methyl branches may represent between about 20 percent to about 99 percent of the total number of branches present in the branched anionic surfactant. In some embodiments, methyl branches may represent greater than about 50 percent of the total number of branches in a branched anionic surfactant. The number of ethyl branches in the alcohol may represent, in certain embodiments, less than about 30 percent of the total number of branches. In other embodiments, the number of ethyl branches, if present, may be between about 0.1 percent and about 2 percent of the total number of branches. Branches other than methyl or ethyl, if present, may be less than about 10 percent of the total number of branches. In some embodiments, less than about 0.5 percent of the total number of branches are neither ethyl nor methyl groups.

In an embodiment which further employs aliphatic anionic surfactant, a solution may provided which contains an effective amount of an aliphatic anionic surfactant selected from the group of compounds having the general formula: $R_1O(C_3H_6O)_m(C_2H_4O)_nYX$ wherein $R_1$ is a linear or branched alkyl radical, an alkenyl radical, or an alkyl or alkenyl substituted benzene radical, the non-aromatic portion of the radical containing from 6 to 24 carbon atoms; m has an average value of from 1 to 10; n has an average value of from 1 to 10; Y is a hydrophilic group; and X is a cation, preferably monovalent, for example $Na^+$, $K^+$, $NH_4^+$. Y is a suitable hydrophilic group or substituted hydrophilic group such as, for example, the sulfate, sulfonate, phosphonate, phosphate or carboxylate radical. Preferably, $R_1$ is a branched alkyl radical having at least two branching groups and Y is a sulfonate, carboxylate or phosphate group.

C. Other Optional Additives

The aqueous fluid of the present invention may, optionally, further comprise clay stabilization or sand stabilization material. During oil recovery processes, sands and other materials may become entrained in the recovered oil. This may be mitigated by the addition of a clay stabilization or sand stabilization material. Suitable clay stabilization or sand stabilization materials include epoxy resins, polyfunctional cationic polymers, such as poly(N-acrylamidomethyltriethyl ammonium chloride) or poly(vinylbenzyltrimethyl ammonium chloride).

Other optional ingredients that may be added to the aqueous fluid of the present invention include, but are not limited to polymers such as biopolysaccharides, cellulose ethers, acrylamide-derived polymers, corrosion inhibitors, oxygen scavengers, bactericides, and so forth, and any combination thereof.

VI. Methods of Use

The aqueous fluid of the present invention is introduced into the crude oil-bearing formation, typically by injecting the fluid into the formation.

The aqueous fluid may be used in secondary or tertiary oil recovery processes, although the use of such fluids in other applications is also not excluded.

A. Hydraulic Fracturing

In hydraulic fracturing the fracturing fluid comprising water soluble polymer and at least one zwitterionic surfactant is pumped into the targeted formation at a rate in excess of what can be dissipated through the natural permeability of the formation rock. The fracturing fluids result in a pressure build up until such pressure exceeds the strength of the formation rock. When this occurs, the formation rock fails and a so-called "fracture" is initiated. With continued pumping, the fracture grows in length, width and height.

At a predetermined time in the pumping process, solid particulate is typically added to the fluid that is being pumped. This particulate is carried down the well, out of the wellbore and deposited in the created fracture. It is the purpose of this specially designed particulate to keep the fracture from "healing" to its initial position (after pumping has ceased). The particulate is said to be propping open the fracture and is therefore designated as "proppant". The fracture, which is generated by the application of this stimulation technique, creates a conductive path to the wellbore for the hydrocarbon.

Typical proppant is selected from the group consisting of gravel, quartz sand grains, sintered bauxite, glass and ceramic beads, walnut shell fragments, or aluminum pellets. The fracturing fluid may also include a thermal stabilizer, for example sodium thiosulfate, methanol, ethylene glycol, isopropanol, thiourea, and/or sodium thiosulfite. The fracturing fluid may also include KCl as a clay stabilizer.

B. Chemical Flooding

Aqueous medium, such as soft water, brackish water, or a brine, can be utilized in the solution including the mixture of water soluble polymer and at least one member of the group consisting of zwitterionic surfactants of the invention.

Optionally, after injection of the aqueous fluid comprising the present mixture of water soluble polymer and at least zwitterionic surfactant of the present invention, in addition to crude oil having generally the viscosity of the oil-bearing formation of the oil well to be treated, various hydrocarbon solvents may be employed to displace the aqueous solution out into the reservoir. Hydrocarbon solvents such as the low molecular weight, generally liquid hydrocarbons boiling below the gasoline range, such as the lower alkanes including butane, propane, pentane, hexane and heptane, as well as natural gasoline, petroleum naphtha and kerosene or mixtures of these hydrocarbons, are useful. Both sweet and sour crude oil is useful as a hydrocarbon to displace the aqueous solution out into the subterranean reservoir of oil or gas.

Optionally, injection of a preflush fluid may be utilized prior to injection of the aqueous fluid of the present invention. The preflush may consist of a hydrocarbon fluid, a brine solution, or simply water.

Also, injection of the aqueous fluid composition of the present invention may optionally be followed by an injection of a surfactant.

This polymeric flush or mobility control fluid may once again be followed by a water flush which may be brine or saline or softened water, or fresh water.

Oil is recovered at a production well spaced apart from the injection well as the drive fluid pushes the mobility buffer slug which sweeps the oil out of the pores in the formation and to the production well. Once the water/oil emulsion reaches the surface, it is put into holding tanks where it is subsequently demulsified, thereby allowing the oil to separate from the water through the natural forces of gravity.

For example, a hydrocarbon recovery composition of the present invention may be added to a portion of hydrocarbon containing formation that may have an average temperature of more than 50° C. and preferentially more than 70° C. To facilitate delivery of an amount of the hydrocarbon recovery composition to the hydrocarbon containing formation, the hydrocarbon recovery composition may be combined with water or brine to produce an injectable fluid. Typically about 0.1 to about 3 wt % of the water soluble polymer and about 0.08 to about 3 wt % of the zwitterionic surfactant, based on the total weight of injectable fluid, may be injected into the hydrocarbon containing formation through an injection well.

In certain embodiments, the concentration of the hydrocarbon recovery composition injected through the injection well may be about 0.1 to about 10 wt % of the water soluble polymer and about 0.01 to about 10 wt % of the zwitterionic surfactant, based on the total weight of injectable fluid. In some embodiments, the concentration of the hydrocarbon recovery composition may be about 0.3 to about 3 wt % water soluble polymer, about 0.08 to about 3 wt % zwitterionic surfactant, and 0.1 to 20 wt. % inorganic salt based on the total weight of injectable fluid.

In some embodiments, a hydrocarbon recovery composition may be added to a portion of a hydrocarbon containing formation.

C. Other Methods of Use

Some other uses of the composition of the present invention include, thickening agents for home care products, liquid laundry detergents, drain cleaners, hard surface cleaners, automatic dishwasher fluids, fracturing fluids in oil and gas fields, thickening hair gels, gel deodorant, and other personal care applications, as well as a fluid loss agent in cement applications. It targets more precisely the improvement of electrolytic stability of polymeric solutions.

EXAMPLES

The surfactants were alkyl amidopropyl betaines or alkyl amidopropyl sultaines. The general formula of alkyl amidopropyl betaines is listed in Formula VIII listed in Example 1.

The general formula of alkyl amidopropyl sultaines is listed as Formula VIII.

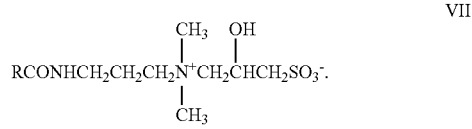

VII

In particular these example tested the following surfactants Erucic Acid Amidopropyl Betaine, Oleoylamidopropyl dimethyl betaine, Cocamidopropyl betaine, Lauriamidopropyl betaine, Cocamidohydroxy sultaine in an aqueous composition.

Example 1

It is well known that the presence of salt breaks down the viscosity of polyelectrolytes. Thus, a first example tested if a zwitterionic surfactant could protect a PS-b-(EA-co-AA) diblock that is 70% hydrolyzed. The diblock was 3 k polystyrene 30K EA-co-AA (30K ethylene acetate-co-acrylic acid).

A solution of water soluble polymer was diluted to the required value in water and mixed with high speed homogenizer (ULTRA TURRAX T-25) at a speed of 20000 rpm. The resulting viscosity and viscoelasticity were measured in an AR-G2 rheometer (TA instruments) with a 4 degree 40 mm cone and plate geometry. Electrolytes were added (typically 10 wt % KCl for these examples), mixed with high speed homogenizer and the resulting viscosity and viscoelasticity were measured. Zwitterionic surfactant additives were added and mixed with high speed homogenizer and the resulting viscosity and viscoelasticity were measured. Here the term viscoelasticity refers to the viscoelastic storage (G') or loss (G") modulus measured as a function of frequency of oscillation ($\omega$).

The viscoelasticity is built through the hydrophobic association of the ethyl acrylate (EA). This example used a small amount of betaine surfactant to protect the chain and the associations from the presence of salt. FIG. 1 and FIG. 1A show the viscosity as a function of shear rate for a 2% diblock solution in 10% KCl, at various levels of betaine surfactant. The betaine surfactant has the formula VIII, wherein R is a C18 alkyl hydrophobe with one double bond.

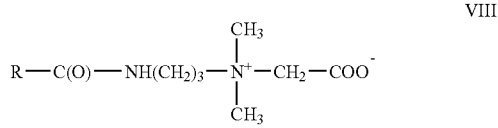

VIII

Figure 2:
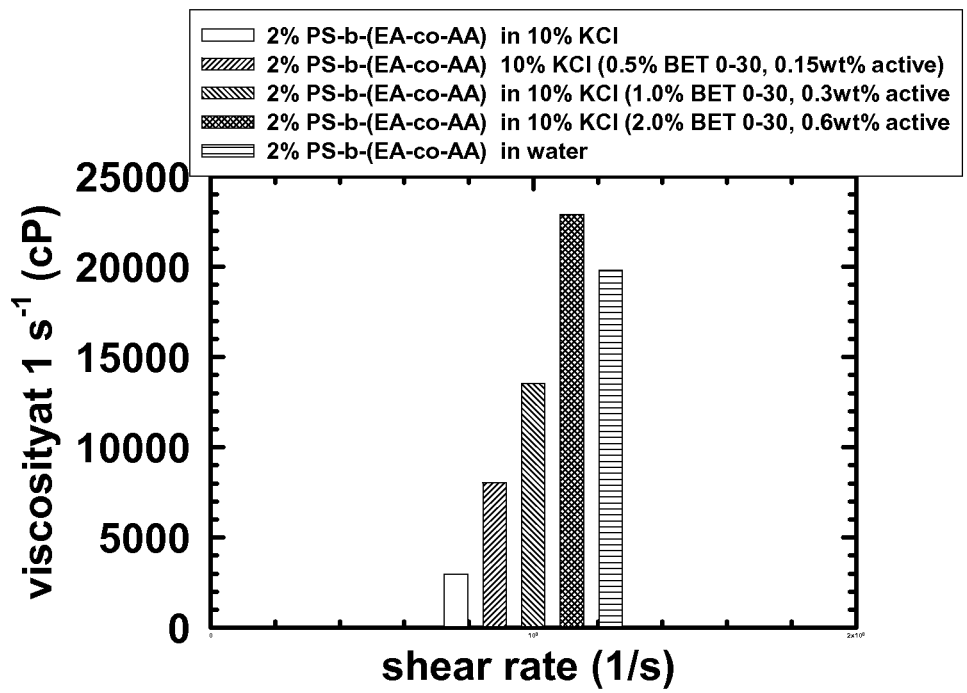

Typically, surfactants break down the viscoelasticity of hydrophobically modified polymers, and do not provide resistance to salt. However, FIGS. 1 and 2 show the small amount of betaine surfactant protected the hydrophobically modified water soluble polymer chain from salt.

Example 2

In this example the effect of anionic surfactants on a polyelectrolyte was tested. A small amount (about 0.2 wt %) of Sodium Laureth Sulfate (SLES) will normally break down the viscoelasticity of the PS-b-(EA-co-AA) diblock solution in de-ionized water. The procedure for this experiment is the same as described above, with the exception that the Sodium Laureth Sulfate was added in lieu of the electrolyte.

The addition of long chain zwitterionic surfactant recovered the viscoelasticity of the polyelectrolyte mixed with anionic surfactant.

Example 3

This example investigated the salt resistance of PS-b-(EA-co-AA) diblocks with the addition of zwitterionic surfactants. This example showed the viscoelasticity can be recovered through the addition of a betaine surfactant. The final blends were always clear gels without phase separation.

Figure 3:
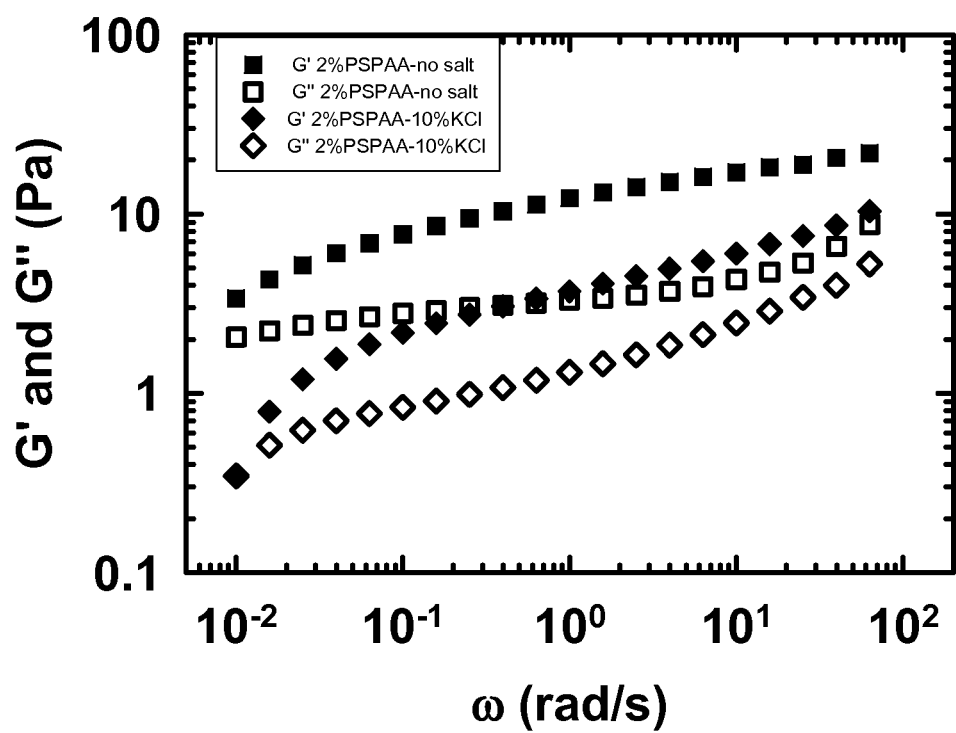
FIG. 3 shows viscoelastic data G' and G" for 2 wt % PS-b-(EA-co-AA) diblock with and without salt in Example 3.

FIG. 3 shows viscoelastic data G' and G" for 2 wt % PS-b-(EA-co-AA) diblock with and without salt. The procedure was the same as described above.

Figure 4:
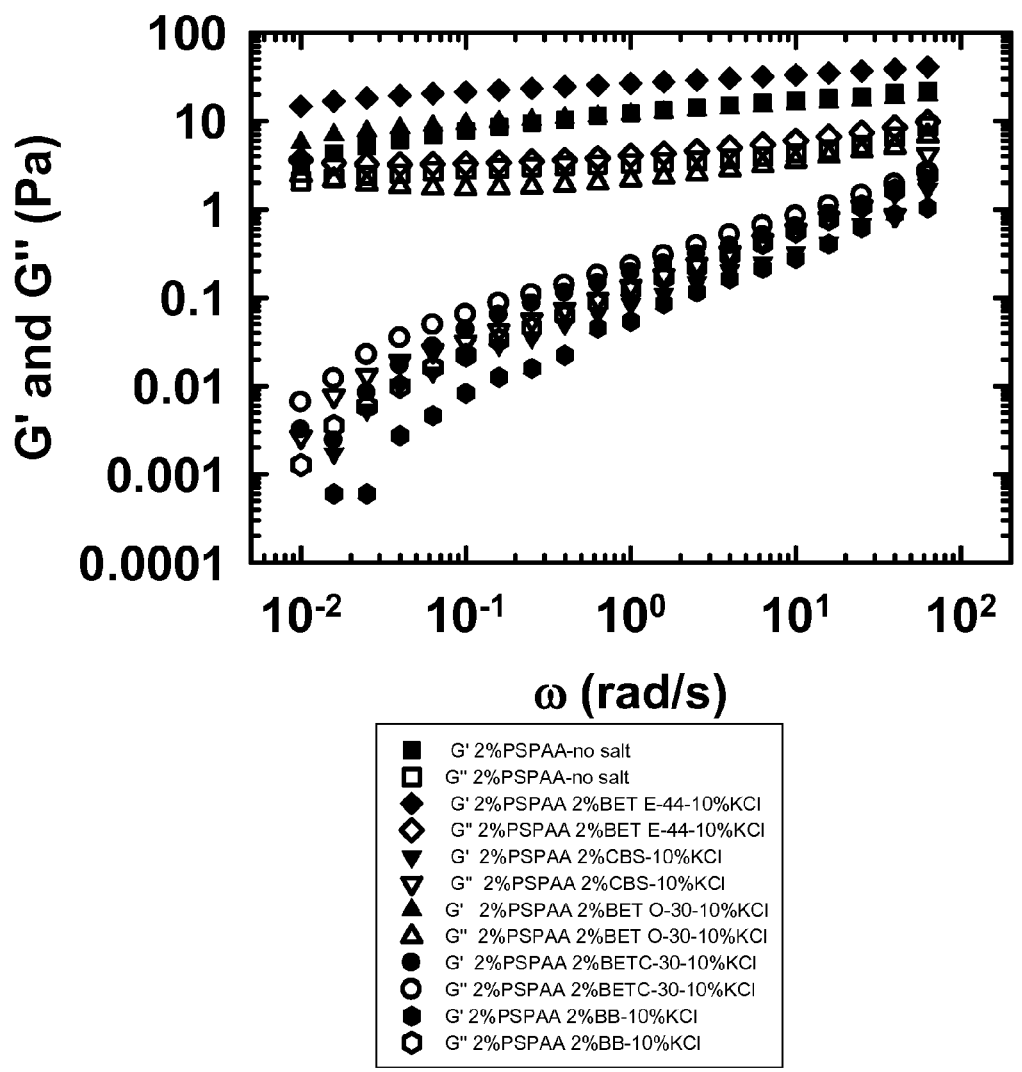
FIG. 4 shows viscoelastic data G' and G" for 2 wt % PS-b-(EA-co-AA) diblock, 10 wt % KCl and 2 wt % additive (0.6 wt % active surfactant). The larger alkane chains prevent the degradation of the viscoelasticity in salt. The other zwitterionics, however, contribute to the loss of viscoelasticity in Example 3 over the surfactant concentration range shown.

FIG. 4 shows viscoelastic data G' and G" for 2 wt % diblock, 10 wt % KCl and 2 wt % zwitterionic additive. The larger alkane chains prevent the degradation of the viscoelasticity in salt. The other zwitterionics, however, contribute to the loss of viscoelasticity in this concentration range. The procedure was the same as described above.

Figure 5:
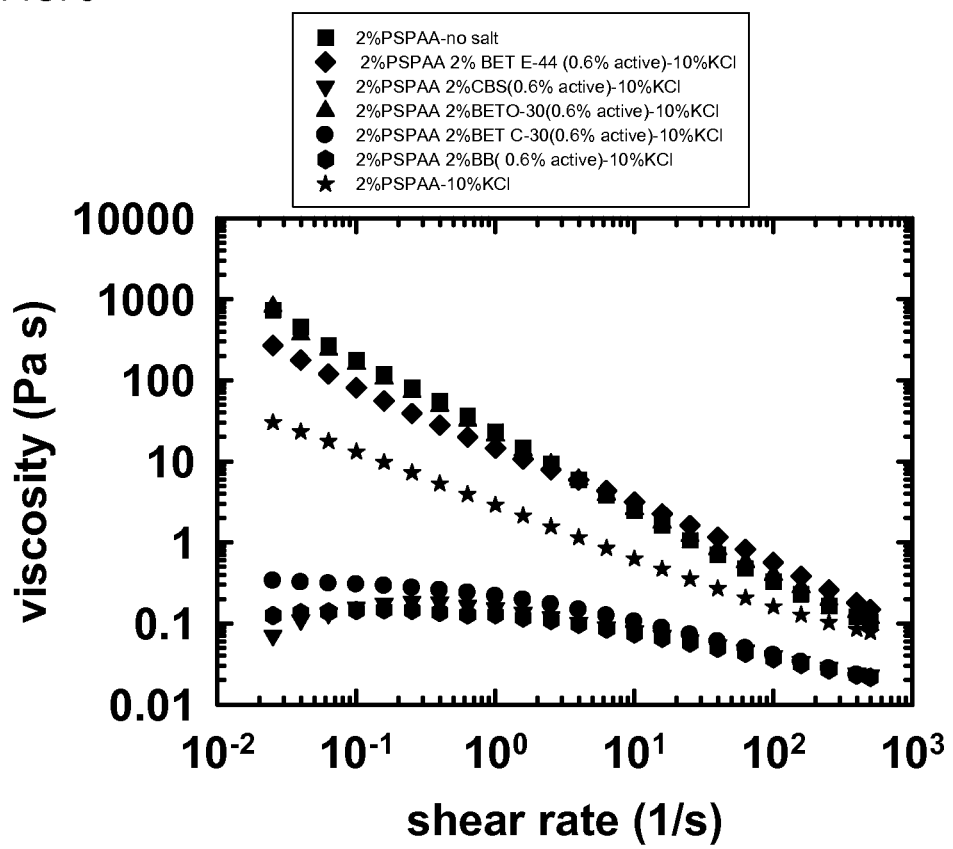
FIG. 5 shows the viscosity results are similar to the results for the viscoelasticity in Example 3.

FIG. 5 shows the viscosity results are similar to the results for the viscoelasticity. In FIG. 5 PSPAA is PS-b-(EA-co-AA) diblock, BET E-44 is MIRATAINE BET E-44, CBS is MIRATAINE CBS, BET O-30 is MIRATAINE 0-30, BET C-30 is MIRATAINE C-30, BB is MIRATAINE BB. All these zwitterionic surfactants come from the MIRATAINE line available from Rhodia Inc, Cranbury, N.J.

MIRATAINE BET 0-30 and MIRATAINE BET E-44 have the best effect.

Figure 6:
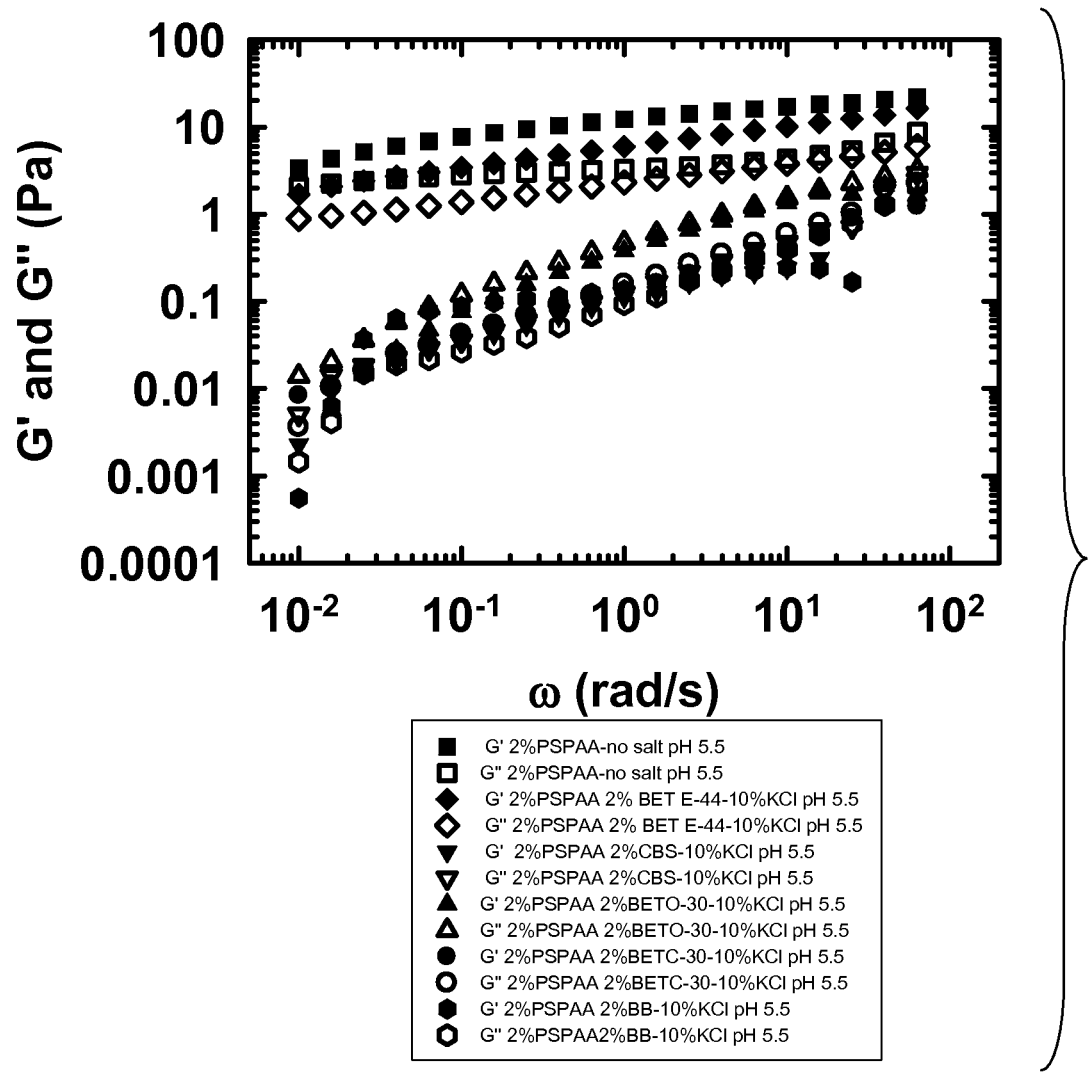
FIG. 6 shows the viscoelasticity in Example 3.
Figure 7:
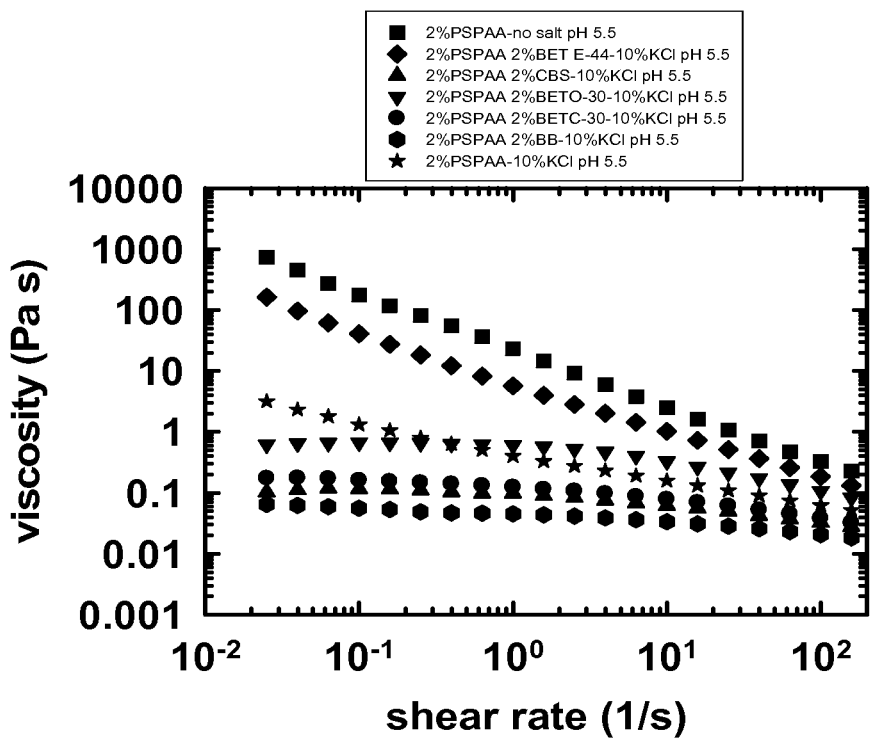
FIG. 7 shows the viscosity of 2 wt % PS-b-(EA-co-AA) diblock, 10% KCl and 2% wt % additive (0.6 wt % active surfactant) at a pH of 5.5 (adjusted using citric acid) in Example 3.

The effect of pH was also studied. FIG. 6 shows the viscoelasticity and FIG. 7 shows the viscosity of 2 wt % diblock, 10% KCl and 2% surfactant at a pH of 5.5 (adjusted using citric acid). In this case MIRATAINE BET E-44 has the only positive effect. The pH of the others was around 7. The procedure was the same as above.

Example 4

Figure 8:
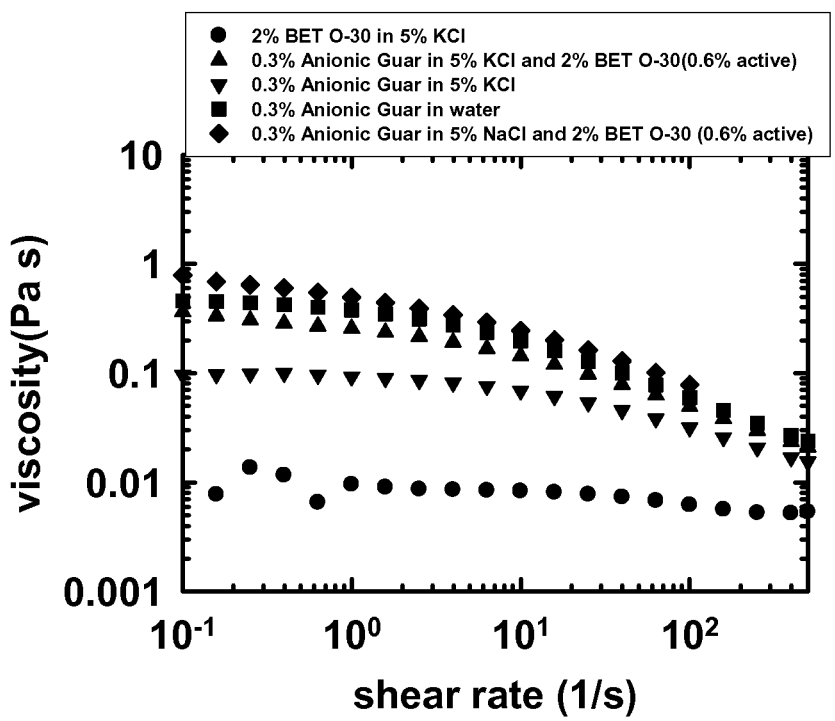
FIG. 8 shows the resistance of anionic guar to 5 wt % KCl and NaCl in water with the addition of a zwitterionic surfactant in Example 4. The viscosity of the surfactant additive is also shown, indicating this is not an additive effect.

The effectiveness of the surfactant on the salt resistance of other polymers was also tested. FIG. 8 shows the resistance of anionic guar to 5 wt % KCl in water with the addition of a zwitterionic surfactant. The graph shows the viscosity as a function of shear rate. The solution of surfactant, salt and anionic guar phase separates over time, but retains the viscosity for a few hours, unlike the solution containing no surfactant, which readily loses viscosity. The procedure is the same as above.

It is apparent that embodiments other than those expressly described above come within the spirit and scope of the present claims. Thus, the present invention is not defined by the above description, but rather is defined by the claims appended hereto.

The invention claimed is:
1. An aqueous composition comprising a mixture of:
water,

0.1 to 10 weight % water soluble polymer for forming a viscoelastic gel when in solution in said water when the polymer concentration exceeds a critical gelling concentration, said water soluble polymer having a number average molecular weight of between 5 kg/mol and 20,000 kg/mol, wherein the water soluble polymer consists of at least one member selected from the group consisting of polystyrene-poly acrylic diblock polymers, and 0.08-3 weight % zwitterionic surfactant, selected from at least one member of the group consisting of Erucic Acid Amidopropyl Betaine and Oleoylamidopropyl betaine, wherein the zwitterionic surfactant is not an amphoteric surfactant, and less than 0.3 wt % each of an anionic surfactant, amphoteric surfactant and nonionic surfactant, and 1 to 10 weight % inorganic salt selected from at least one member of the group consisting of monovalent electrolytes, divalent electrolytes and trivalent electrolytes, wherein the monovalent electrolytes have a formula A+B−, wherein A is an alkali metal and B is a halogen, wherein the divalent electrolytes have a formula $A_a^{+x}B_b^{-Y}$, wherein A is selected from the group consisting of calcium, magnesium, ferrous iron and B is selected from the group consisting of chloride, bromide, sulfate, carbonate, nitrate and a times X is +2 and b times Y is −2, wherein the trivalent electrolytes have a formula $A_a^{+x}B_b^{-Y}$, wherein A is selected from the group consisting of ferric iron and B is selected from the group consisting of chloride, bromide, sulfate, carbonate and nitrate and a times X is +3 and b times Y is −3, and optionally a proppant.

2. The aqueous composition of claim 1, wherein there is an absence of anionic surfactant.

3. The composition according to claim 1, wherein the water-soluble polymer is in the composition in an amount of 0.3 to 10 weight % and there is an absence of anionic surfactant.

4. The composition according to claim 1, wherein the water-soluble polymer is polystyrene-b-(polyethyl acrylate-co-polyacrylic acid) diblock polymer, wherein the surfactant of the composition consists of said zwitterionic surfactant and said less than 0.3 wt % each of amphoteric surfactant, anionic, and nonionic surfactant, and wherein the zwitterionic surfactant is erucic amidopropyl betaine.

5. The composition according to claim 1, wherein the water-soluble polymer is present in a range of 2 to 10% by weight and the inorganic salt is present in a range of 1 to 10 weight %.

6. The composition according to claim 1, wherein the zwitterionic surfactant is erucic amidopropyl betaine.

7. The composition according to claim 1, wherein the zwitterionic surfactant is erucic amidopropyl betaine and the water soluble polymer is a polystyrene-(poly ethyl acrylate-co-poly acrylic acid) diblock polymer.

8. The composition according to claim 1, wherein the zwitterionic surfactant is selected from the group consisting of erucic amidopropyl betaine, oleoylamidopropyl betaine, and mixtures thereof, wherein the water soluble polymer is a polystyrene-(poly ethyl acrylate-co-poly acrylic acid) diblock polymer.

9. The composition according to claim 1, having an absence of anionic surfactant, amphoteric surfactant and of nonionic surfactant.

10. The composition according to claim 1, wherein brine is in the composition.

11. The composition according to claim 1, wherein the at least one inorganic salt is independently selected from the group consisting of sodium chloride and potassium chloride.

12. The composition of claim 1, wherein the proppant is part of the composition.

13. The aqueous composition of claim 1, comprising a mixture of:

said water, 0.3 to 3 weight % said at least one water soluble polymer, wherein the water soluble polymer is polystyrene-(poly ethyl acrylate-co-poly acrylic acid) diblock polymer, 0.15 to 3 weight % said zwitterionic surfactant, wherein the zwitterionic surfactant is selected from one or more members of the group consisting of erucic amidopropyl betaine, oleoylamidopropyl betaine, and mixtures thereof, and less than 0.3 wt % each of anionic surfactant, amphoteric surfactant and of nonionic surfactant; and 1 to 10 weight % said at least one inorganic salt independently selected from the group consisting of sodium chloride and potassium chloride; and optionally said proppant.

14. The composition of claim 13, wherein the zwitterionic surfactant of the composition consists of erucic amidopropyl betaine.

15. The composition of claim 13, wherein the zwitterionic surfactant of the composition consists of erucic amidopropyl betaine, wherein the water-soluble polymer is polystyrene-b-(polyethyl acrylate-co-polyacrylic acid) diblock polymer.

16. The composition of claim 1 consisting of a mixture of:

The water;

the 0.1 to 10 weight % water soluble polymer;

the 0.08-3 weight % zwitterionic surfactant;

the less than 0.3 wt % each of anionic surfactant, amphoteric surfactant and of nonionic surfactant;

the 1 to 10 weight at least one inorganic salt selected from at least one member of the group consisting of monovalent electrolytes, divalent electrolytes and trivalent electrolytes; and at least one member of the group consisting of proppant, co-solvents, acids, bases, buffers, chelating agents for control of multivalent cations, freezing point depressants, clay stabilization material, sand stabilization material, biopolysaccharides, cellulose, cellulose ethers, acrylamide-derived polymers, corrosion inhibitors, oxygen scavengers, and bactericides;

the clay stabilization material selected from the group consisting of epoxy resins, poly(N-acrylamidomethyltriethyl ammonium chloride) and poly(vinylbenzyltrimethyl ammonium chloride);

the sand stabilization material selected from the group consisting of epoxy resins, poly(N-acrylamidomethyltriethyl ammonium chloride), and poly(vinylbenzyltrimethyl ammonium chloride);

the co-solvent selected from at least one member of the group consisting of propylene glycol, glycerin, and aliphatic alcohol having an average carbon number of 4 to 24.

17. A method for recovering hydrocarbons from a subterranean formation, comprising introducing to the formation an aqueous fluid comprising the composition of claim 1.

18. The method of claim 17, wherein the subterranean formation surrounds a well bore, and the aqueous fluid is injected into the bore as a fracturing fluid and then creates fissures in the subterranean formation.

19. An aqueous composition consisting of a mixture of:
water;
0.1 to 10 weight % water soluble polymer for forming a viscoelastic gel when in solution in said water when the polymer concentration exceeds a critical gelling concentration,
said water soluble polymer having a number average molecular weight of between 5 kg/mol and 20,000 kg/mol,
wherein the water soluble polymer is selected from at least one member of the group consisting of polystyrene-poly acrylic diblock polymers and anionic guar;
0.08-3 weight % Erucic Acid Amidopropyl Betaine zwitterionic surfactant, wherein the zwitterionic surfactant is not an amphoteric surfactant;
less than 0.3 wt % each of anionic surfactant, amphoteric surfactant and of nonionic surfactant;
1 to 10 weight at least one inorganic salt selected from at least one member of the group consisting of monovalent electrolytes, divalent electrolytes and trivalent electrolytes,
wherein the monovalent electrolytes have a formula A+B−, wherein A is an alkali metal and B is a halogen,
wherein the divalent electrolytes have a formula $A_a^{+x}B_b^-$ r, wherein A is selected from the group consisting of calcium, magnesium, ferrous iron and B is selected from the group consisting of chloride, bromide, sulfate, carbonate, nitrate and a times X is +2 and b times Y is −2;
wherein the trivalent electrolytes have a formula $A_a^{+x}B_b^-$ r, wherein A is selected from the group consisting of ferric iron and B is selected from the group consisting of chloride, bromide, sulfate, carbonate and nitrate and a times X is +3 and b times Y is −3; and
optionally at least one member of the group consisting of proppant, co-solvents, acids, bases, buffers, chelating agents for control of multivalent cations, freezing point depressants, day stabilization material, sand stabilization material, biopolysaccharides, cellulose, cellulose ethers, acrylamide-derived polymers, corrosion inhibitors, oxygen scavengers, and bactericides;
the clay stabilization material selected from the group consisting of epoxy resins, poly(N-acrylamidomethyltriethyl ammonium chloride) and poly(vinylbenzyltrimethyl ammonium chloride);
the sand stabilization material selected from the group consisting of epoxy resins, poly(N-acrylamidomethyltriethyl ammonium chloride), and poly(vinylbenzyltrimethyl ammonium chloride);
the co-solvent selected from at least one member of the group consisting of propylene glycol, glycerin, and aliphatic alcohol having an average carbon number of 4 to 24.

20. The composition according to claim 19, wherein there is an absence of anionic surfactant, amphoteric surfactant, and nonionic surfactant.

21. The composition according to claim 19, wherein the water soluble polymer is in the composition in an amount of 0.3 to 10 weight % and there is an absence of anionic surfactant.

22. The composition of claim 19, consisting of:
said water;
said water soluble polymer;
0.08-3 weight % said surfactant consisting of said Erucic Acid Amidopropyl Betaine,
less than 0.3 wt % each of anionic surfactant, amphoteric surfactant and of nonionic surfactant,
at least one member of the group consisting of proppant, co-solvents, acids, bases, buffers, chelating agents for control of multivalent cations, freezing point depressants, clay stabilization material, sand stabilization material, biopolysaccharides, cellulose, cellulose ethers, acrylamide-derived polymers, corrosion inhibitors, oxygen scavengers, and bactericides;
the clay stabilization or sand stabilization material selected from the group consisting of epoxy resins, poly(N-acrylamidomethyltriethyl ammonium chloride) and poly(vinylbenzyltrimethyl ammonium chloride);
the co-solvent selected from at least one member of the group consisting of propylene glycol, glycerin, and aliphatic alcohol having an average carbon number of 4 to 24;
1 to 10 weight % said at least one inorganic salt selected from the group consisting of sodium chloride and potassium chloride.

23. The composition of claim 19, having an absence of anionic surfactant, amphoteric surfactant, and nonionic surfactant, wherein the inorganic salt is present in an amount of 1 to 10 weight % of the composition and said at least one inorganic salt is independently selected from the group consisting of sodium chloride and potassium chloride.

24. The composition of claim 19, wherein the polymer is polystyrene-b-(polyethyl acrylate-co-polyacrylic acid) diblock polymer, wherein the surfactant of the composition consists of said zwitterionic surfactant and less than 0.3 wt % each of amphoteric surfactant and nonionic surfactant.

25. The composition of claim 24, wherein the inorganic salt is selected from at least one member of the group consisting of sodium chloride and potassium chloride.

26. The composition of claim 19, consisting of a mixture of:
said water;
said 0.1 to 10 weight % at least one water soluble polymer,
0.08-3 weight % said zwitterionic surfactant;
said less than 0.3 wt % each of anionic surfactant, amphoteric surfactant and of nonionic surfactant;
1 to 10 weight % said at least one inorganic salt selected from at least one member of the group consisting of sodium chloride and potassium chloride.

27. The composition of claim 19, wherein the zwitterionic surfactant of the composition consists of erucic amidopropyl betaine, wherein the water-soluble polymer is polystyrene-b-(polyethyl acrylate-co-polyacrylic acid) diblock polymer.

* * * * *